Nov. 17, 1964  C. W. PERRY  3,157,382
FLUID-CONTROLLING VALVES
Filed May 28, 1962
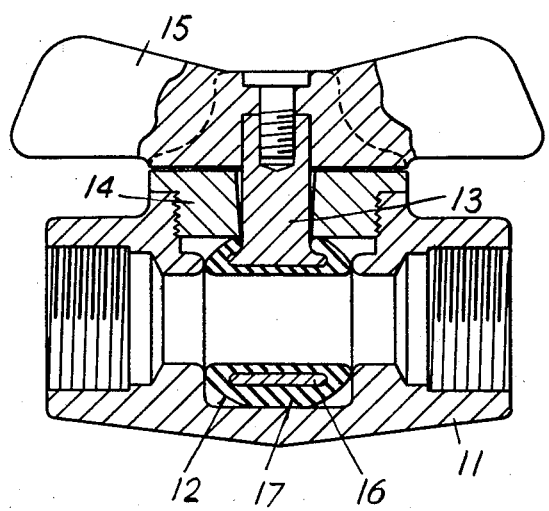

United States Patent Office 3,157,382
Patented Nov. 17, 1964

3,157,382
FLUID-CONTROLLING VALVES
Cecil William Perry, Barnwood, Gloucester, England, assignor to Audco Limited, Newport, England
Filed May 28, 1962, Ser. No. 197,949
Claims priority, application Great Britain, June 1, 1961, 19,766/61
2 Claims. (Cl. 251—312)

This invention relates to fluid-controlling valves of the kind incorporating a generally spherical closure member and the object of the invention is to provide a new or improved valve which offers an efficient but relatively inexpensive construction which is particularly useful for medium pressure service.

In accordance with the invention there is provided a fluid-controlling valve of the kind specified wherein the closure member incorporates a core formed from a piece of metal or other rigid material of tubular configuration together with a facing of resilient material which is applied to the core to provide on the exterior of the closure member part-spherical seating surfaces.

Conveniently, said core comprises a short cylindrical tube which is formed of metal such as brass and which is secured to a stem so that the latter projects at right angles to the axis of the core, the facing then being formed of resilient material such as rubber which is moulded around the interior and exterior of the core, and bonded thereto. The bore extending through the core will, of course, provide a passage through which (in one position of the closure member) fluid can flow, whereas rotation of the closure member from this position will serve to prevent the flow of fluid through the valve.

The invention is now more particularly described with reference to the accompanying drawing which is a sectional view of one example of a fluid-controlling valve in accordance with the invention.

Referring now to the drawing in the fluid controlling valve shown therein there is provided a body 11 which is conveniently formed in one piece from metal such as brass and which is adapted to receive the spherical closure member 12. Thus there is provided a stem 13 which projects through a cover 14 secured to an opening formed in the body, the outer end of said stem being connected to a handle 15 or being shaped for the purpose of receiving a tool whereby the stem can be rotated.

The inner end of said stem 13 is connected to the closure member 12 and the latter incorporates a core 16 in the form of a short cylindrical tube which may also be formed of brass and which is secured to the stem 13 at a position intermediate the axial ends of the core with the stem projecting at right angles to the axis of said core. The core thus projects axially at each end beyond the stem and to the core is applied a facing 17 of resilient material in the form of rubber which is moulded around the core and bonded thereto. Said facing 17 extends through the interior of the core 16 and is shaped on the exterior to provide part-spherical seating surfaces at either end of the closure member. Furthermore the diameter of the closure member 12 is such that when the aforesaid cover 14 is in its operative position an interference fit occurs between the inner face of said cover and the opposite surface of the cavity formed in the body in which the closure member is mounted. This results in compression of the resilient material on the exterior of the closure member in a direction transverse to the axis of the cylindrical core and thereby provides a seal which prevents fluid from escaping between the stem and the cover through which it extends.

If desired the exterior surface of the resilient facing can be coated with an anti-friction material such as the synthetic resin material commonly known as PTFE or alternatively the material forming the resilient facing may include a lubricant material such as molybdenum disulphide.

Having thus described my invention, what I claim as new and desire to secure by Letters Patent is:

1. A fluid controlling valve assembly comprising a valve body having a fluid flow passage extending therethrough, said valve body including spaced apart valve seats concentric with respect to said fluid flow passage, a rotatable valve member located within said body between said valve seats for controlling the fluid flow through the passage, said valve member including a metal tube disposed concentrically with respect to said passage and having a length dimension less than the distance between the spaced apart valve seats, said body having an aperture in communication with the passage between the valve seats, a stem secured to said tube and projecting from the body at right angles to the axis of the tube through said aperture, a facing of resilient material anchored to the exterior and interior of the tube, said facing having part spherical seating surfaces at each end thereof for coaction with said valve seats and the diameter of the facing being sufficient to provide an interference fit between opposed surfaces of the body whereby the facing is compressed in a direction transverse to the axis of the tube for providing a seal between the stem and the aperture in the body through which the stem projects.

2. A fluid controlling valve assembly comprising a valve body having a fluid flow passage extending therethrough, said body including spaced apart valve seats concentric with respect to said fluid flow passage, a rotatable valve member located within said body between said valve seats for controlling the fluid flow through the passage, said valve member including a metal tube disposed concentrically with respect to said passage and having a length dimension less than the distance between the spaced apart valve seats, said body having an aperture in communication with the passage between the valve seats, a cover closing said aperture, a stem secured to said tube and projecting from the body at right angles to the axis of the tube through an opening in the cover, a handle on the stem, a facing of resilient material anchored to the exterior and interior of the tube, said facing having part spherical seating surfaces at each end thereof for coaction with said valve seats, and the diameter of the facing being sufficient to provide an interference fit between the inner surface of the cover and the opposite surface of the body whereby the facing is compressed in a direction transverse to the axis of the tube for providing a seal between the stem and the opening in the cover through which the stem projects.

References Cited in the file of this patent

UNITED STATES PATENTS

| | | |
|---|---|---|
| 1,203,766 | Miller | Nov. 7, 1916 |
| 2,832,563 | Walsh | Apr. 29, 1958 |
| 2,836,388 | Rakus | May 27, 1958 |
| 3,038,489 | Allen | June 12, 1962 |
| 3,052,445 | Kessler | Sept. 4, 1962 |
| 3,100,501 | Hansen et al. | Aug. 13, 1963 |